(12) United States Patent
Hsu et al.

(10) Patent No.: US 11,853,681 B2
(45) Date of Patent: Dec. 26, 2023

(54) POST-ROUTING CONGESTION OPTIMIZATION

(71) Applicant: Taiwan Semiconductor Manufacturing Company, Ltd., Hsinchu (TW)

(72) Inventors: Ching Hsu, Zhubei (TW); Heng-Yi Lin, Taichung (TW); Yi-Lin Chuang, Taipei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 144 days.

(21) Appl. No.: 17/232,491

(22) Filed: Apr. 16, 2021

(65) Prior Publication Data

US 2022/0335197 A1  Oct. 20, 2022

(51) Int. Cl.
*G06F 30/398* (2020.01)
*G06F 30/394* (2020.01)
*G06F 30/392* (2020.01)

(52) U.S. Cl.
CPC .......... *G06F 30/398* (2020.01); *G06F 30/392* (2020.01); *G06F 30/394* (2020.01)

(58) Field of Classification Search
CPC ........ G06F 30/394; G06F 30/30; G06F 30/33; G06F 30/398; G06F 30/392; G06F 30/327; G06F 2115/08; G06F 30/39; G06F 11/261; G06F 30/333; G06F 30/3312; G06F 30/396; G06F 2111/04; G06F 2119/06; G06F 2119/12; G06F 30/18; G06F 30/27; G06F 2111/20; G06F 30/3323; G06F 30/337; G06F 30/367; G06F 1/10; G06F 11/3457; G06F 2111/06; G06F 2111/08; G06F 2111/12; G06F 2115/06; G06F 2119/18; G06F 30/20; G06F 30/35; G06F 30/3947; G06F 30/3953; G06F 9/3869; G06F 1/26; G06F 1/28; G06F 1/30; G06F 1/32; G06F 1/3203; G06F 1/324; G06F 13/20; G06F 18/23; G06F 2111/02; G06F 2213/40; G06F 3/04842; G06F 3/04847; G06F 30/00; G06F 30/31; G06F 30/373; G06F 30/3308; G06F 30/323; G06F 2117/04; G03F 1/36; G03F 1/70; G03F 1/84; G03F 7/7065; G03F 1/00;
(Continued)

(56) References Cited

U.S. PATENT DOCUMENTS

| | | | |
|---|---|---|---|
| 2009/0037857 A1* | 2/2009 | Darden | G06F 30/398 |
| | | | 716/106 |
| 2009/0106715 A1* | 4/2009 | Pikus | G06F 30/398 |
| | | | 716/111 |
| 2020/0104457 A1* | 4/2020 | Chuang | G06F 30/327 |

* cited by examiner

*Primary Examiner* — Binh C Tat
(74) *Attorney, Agent, or Firm* — MERCHANT & GOULD P.C.

(57) ABSTRACT

A method includes: identifying a first design rule check (DRC) violation in a cluster box on an integrated circuit layout; locating a first target cell at a first original location in the cluster box, the first target cell being connected to the first DRC violation; detecting a first plurality of candidate locations for the first target cell in the cluster box; calculating resource costs associated with the first plurality of candidate locations; determining a first relocation location, among the first plurality of candidate locations, associated with a minimum resource cost for the first target cell; and relocating the first target cell from the first original location to the first relocation location.

20 Claims, 15 Drawing Sheets

(58) Field of Classification Search
CPC .... G03F 1/76; G03F 7/70433; G03F 7/70441; G03F 7/70466; G03F 7/705; G01R 31/318357; G01R 31/31704; G01R 31/318364; H01L 23/49816; H01L 24/32; H01L 24/48; H01L 24/49; H01L 2924/15311; H01L 23/528; H01L 27/0207; H01L 23/5386; H01L 2224/49176; H01L 2224/48227; H01L 2224/73204; H01L 2224/73267; H01L 23/5389
USPC .................................................. 716/110–118
See application file for complete search history.

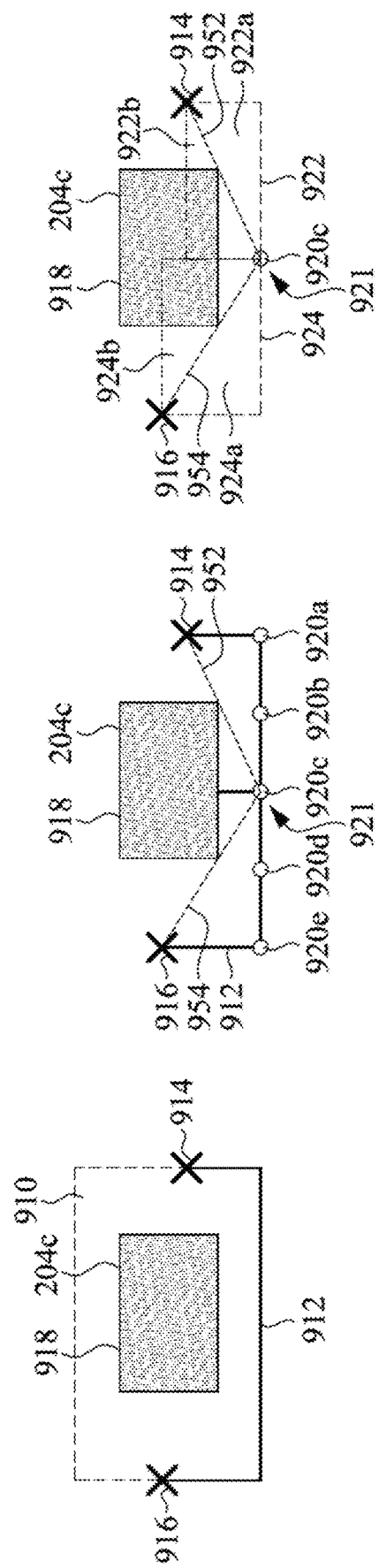

POST-ROUTING CONGESTION OPTIMIZATION

BACKGROUND

The semiconductor integrated circuit (IC) industry has experienced rapid growth. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing are needed. In the mainstream course of IC evolution, functional density (i.e., the number of interconnected devices per chip area) has generally increased while geometry size (i.e., the smallest component that can be created using a fabrication process) has decreased. However, this mainstream evolution needs to follow the Moore's rule by a huge investment in facility establishment. Therefore, it has been a constant need to develop ICs with smaller chip areas, lower costs, and a shorter turn-around-time.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the invention and are not intended to be limiting.

FIG. 9 is a diagram illustrating anchor buffering in accordance with some embodiments.

FIG. 10 is a diagram illustrating anchor buffering in accordance with some embodiments.

FIG. 11 is a diagram illustrating anchor buffering in accordance with some embodiments.

DETAILED DESCRIPTION

Figure 1:
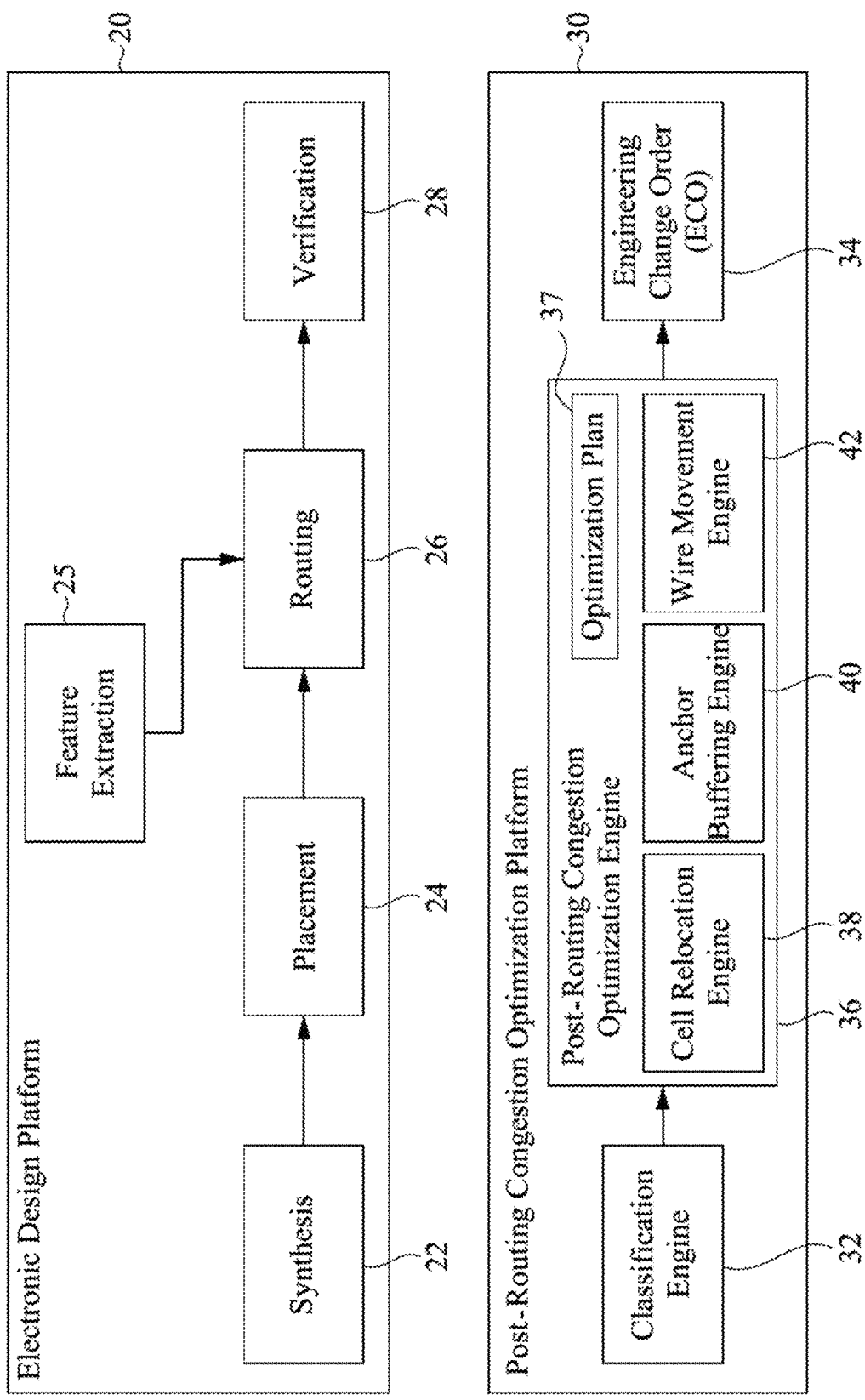
FIG. 1 is a block diagram illustrating an electronic device design system in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In an electronic circuit design process, one or more electronic design automation (EDA) tools may be utilized to design, optimize, and verify semiconductor device designs, such as circuit designs in a semiconductor chip. During placement, a placer tool may produce an (electronic circuit) placement layout based on a given circuit design, which may be developed by a circuit designer and which may include, for example, circuit design information such as electrical diagrams, high level electrical description of the circuit design, a synthesized circuit netlist, or the like. The placement layout includes information indicating physical positions of various circuit elements of the semiconductor device. After the placement of the device is completed, clock-tree synthesis and routing may be performed. During routing, wires or interconnections may be formed to connect the various circuit elements of the placement layout.

After the placement layout has been routed, the resulting electronic device design may be checked for compliance with various design rules, design specifications, or the like. For example, the electronic device design may be checked for various design rule check (DRC) violations. Some DRC violations may be caused by routing congestion, for example, as routing lines may become congested in certain regions of the electronic device design which can result in DRC violations. Routing congestion can significantly impede efforts to reduce or minimize chip size in various designs.

In a post-layout simulation stage, a physical verification (PV) is performed taking into consideration parameters acquired in previous stages such as a pre-layout simulation. A simulation of transistor-level behavior is conducted to examine whether the chip performance meets the required system specifications. Based on the results of the physical verification, some DRC violations may be fixed. An engineering change order (ECO) operation may be employed to correct the DRC violations. An ECO operation is the process of inserting a logic change directly into the netlist after it has already been processed by an automatic tool. Before the chip masks are made, ECOs are usually done to save time, by avoiding the need for full ASIC logic synthesis, technology mapping, placement, routing, feature extraction, and timing verification. EDA tools are often built with incremental modes of operation to facilitate this type of ECO. Built-in ECO routing may help with implementing physical-level ECOs.

Some DRC violations are hard to fix, called hard-to-fix (HTF) DRC violations. It may be hard for IC designers to tell whether a DRC violation is an HTF DRC violation based on PV results. Some DRC violations inside a cluster of DRC violations may be HTF DRC violations and may not be fixed even after several fix iterations. Some scatter DRC violations may also be HTF DRC violations.

DRC violations inside a cluster are often challenging to fix, without existing unified fixing approaches. Fixing DRC violations inside a cluster depends on engineers' experience. Even experienced engineers do not know how to address this potential issue in a systematic manner. Manual DRC violation fixing may not be capable of cleaning DRC violations caused by tool limitation and route congestion. The fixing process may take many iterations and more than one week to converge.

In accordance with some embodiments, a system and a method for post-routing congestion optimization are provided. The system and the method utilize techniques including relocating a target cell from a original location to a relocation location (referred to as cell relocation) and inserting/selecting anchor buffers (referred to as anchor buffering) and optimize post-routing congestion based on an optimization plan. As a result, DRC violations on an IC layout can be significantly reduced, and the fix rate of DRC violations can be significantly increased.

FIG. 1 is a block diagram illustrating an electronic device design system 10 in accordance with some embodiments. The electronic device design system 10 is operable to optimize post-routing congestion. The electronic device design system 10 includes, among other things, an electronic design platform 20 a post-routing congestion optimization platform 30. In some embodiments, the electronic design platform 20 and/or the post-routing congestion optimization platform 30 may be implemented in hardware, firmware, software, or any combination thereof. For example, in some embodiments, the electronic design platform 20 and/or the post-routing congestion optimization platform 30 may be at least partially implemented as instructions stored on a computer-readable storage medium, which may be read and executed by one or more computer processors or processing circuitry. The computer-readable storage medium may be, for example, read-only memory (ROM), random access memory (RAM), flash memory, hard disk drive, optical storage device, magnetic storage device, electrically erasable programmable read-only memory (EEPROM), organic storage media, or the like.

The electronic design platform 20 may include a plurality of electronic device design tools that may be implemented at least in part as software tools which, when executed by one or more computing devices, processors, or the like, can be utilized to design and generate one or more electronic circuit layouts, including electronic circuit placement layouts and associated routing for electronic devices circuits, which may include, for example, one or more integrated circuits (ICs).

In some embodiments, the electronic design platform 20 and the post-routing congestion optimization platform 30 may be included in or otherwise implemented by a same apparatus, such as a same computing system or device. In other embodiments, the electronic design platform 20 and the post-routing congestion optimization platform 30 may be included in or otherwise implemented by separate apparatuses, such as separate and remotely located computing systems or devices.

The electronic design platform 20 includes electronic device design tools which can be used, for example, to design high-level programming descriptions of analog and/or digital circuitry for an electronic device. In some embodiments, the high-level programming descriptions can be implemented using a high-level programming language, such as C, C++, LabVIEW, MATLAB, a general purpose system design or modeling language, such as SysML, SMDL and/or SSDL, or any other suitable high-level programming language. In some embodiments, the electronic design platform 20 may include various additional features and functionalities, including, for example, one or more tools suitable to simulate, analyze, and/or verify the high-level programming descriptions of circuitry for the electronic device.

In some embodiments, the electronic design platform 20 includes, among other things, a synthesis tool 22, a placement tool 24, a feature extraction tool 25, a routing tool 26, and a verification tool 28, each of which may be implemented at least in part as software tools accessible to and executable by one or more computing devices, processors or the like.

The synthesis tool 22 translates one or more characteristics, parameters, or attributes of the electronic device into one or more logic operations, one or more arithmetic operations, one or more control operations, or the like, which may then be translated into the high-level programming descriptions in terms of the analog circuitry and/or the digital circuitry.

The placement tool 24 generates cells which correspond to, or otherwise implement, the one or more logic operations, one or more arithmetic operations, one or more control operations, or the like produced by the synthesis tool 22. The cells may include geometric shapes which correspond to various features of semiconductor devices, including, for example, diffusion layers, polysilicon layers, metal layers, and/or interconnections between layers. In some embodiments, the placement tool 24 may provide one or more high-level software level descriptions of the geometric shapes, the locations of the geometric shapes, and/or the interconnections between the geometric shapes.

In some embodiments, the geometric shapes for some of the analog circuitry and/or the digital circuitry can be defined in accordance with a standard cell from among a predefined library of standard cells associated with a technology library. The standard cell represents one or more semiconductor devices as well as their interconnection structures that are configured and arranged to provide a logical function, such as AND, OR, XOR, XNOR, or NOT, or a storage function, such as a flipflop or a latch. The predefined library of standard cells may be defined in terms of geometric shapes which correspond to diffusion layers, polysilicon layers, metal layers, and/or interconnections between layers. Thereafter, the placement tool 24 assigns locations for the geometric shapes on a printed circuit board (PCB) and/or a semiconductor substrate.

The electronic design platform 20 may perform clock tree synthesis (CTS) on a design generated, for example, by the placement tool 24. In some embodiments, the placement tool 24 may perform the clock tree synthesis. In other embodiments, a CTS tool may be included in the electronic design platform 20 to perform CTS on designs received from the placement tool 24. Clock tree synthesis generally refers to a process of synthesizing a clock tree to achieve zero or minimal skew and insertion delay, and may include inserting one or more buffers or inverters along clock paths of the electronic device design.

The routing tool 26 produces physical interconnections between the cells or the geometric shapes in the placement layout provided by the placement tool 24. In some embodiments, the routing tool 26 utilizes a textual or an image-based netlist describing the analog circuitry, the digital circuitry, the technology library, a semiconductor foundry for fabricating the electronic device and/or a semiconductor technology node for fabricating the electronic device to assign the interconnections between the geometric shapes.

The verification tool 28 may perform various verifications or checks on an electronic circuit placement layout, e.g., after placement and routing. For example, in some embodiments, the verification tool 28 can analyze the electronic circuit placement layout and can provide a static timing analysis (STA), a voltage drop analysis, also referred to an IREM analysis, a Clock Domain Crossing Verification (CDC check), a formal verification, also referred to as model checking, equivalence checking, or any other suitable analysis and/or verification. In some embodiments, the verification tool 28 can perform an alternating current (AC) analysis, such as a linear small-signal frequency domain analysis, and/or a direct current (DC) analysis, such as a nonlinear quiescent point calculation or a sequence of nonlinear operating points calculated while sweeping a voltage, a current, and/or a parameter to perform the STA, the IREM analysis, or the like.

The verification tool 28 verifies that the electronic device design, including the layout of the cells or geometric shapes provided by the placement tool 24, as well as the interconnections between the cells or geometric shapes provided by the routing tool 26, satisfies one or more specifications, rules, or the like associated with the electronic device design. The verification tool 28 may perform a physical verification, in which the verification tool 28 verifies whether an electronic device design is physically manufacturable, and that the resulting chips will meet the design specifications and will not have physical defects which prevent the chips from functioning as designed.

The verification tool 28 may perform a DRC to determine whether the electronic device design, including the geometric shapes, the locations of the geometric shapes, and/or the interconnections between the geometric shapes assigned by the placement tool 24 and/or the routing tool 26, satisfies a series of recommended parameters, referred to as design rules, as may be defined by a semiconductor foundry and/or semiconductor technology node for fabricating the electronic device. The verification tool 28 may determine the presence of one or more DRC violations in the electronic device design, and in some embodiments, the verification tool 28 may generate a DRC-violation map indicating a location of the one or more DRC violations in the electronic device design.

The feature extraction tool 25 may perform feature extraction on the electronic circuit placement layout, including the physical interconnections between the cells or the geometric shapes in the placement layout produced by the routing tool 26. In other words, the feature extraction is performed at a post-routing stage. In some embodiments, the feature extraction tool 25 may extract information associated with one or more features of the electronic circuit placement layout. The extracted features may include any characteristics or parameters associated with the electronic circuit placement layout. In some embodiments, the feature extraction tool 25 analyzes a plurality of regions of the electronic circuit placement layout and extracts features associated with each of the plurality of regions. For example, the feature extraction tool 25 may perform feature extraction on each of a plurality of grid units of the electronic circuit placement layout and/or on each of a plurality of neighboring grid units of the electronic circuit placement layout. The feature extraction tool 25 may be implemented at least in part as software tools accessible to and executable by one or more computing devices, processors or the like. In some embodiments, the feature extraction tool 25 may be implemented as circuitry operable to perform any of the functions described herein with respect to the feature extraction tool 25.

Figure 2:
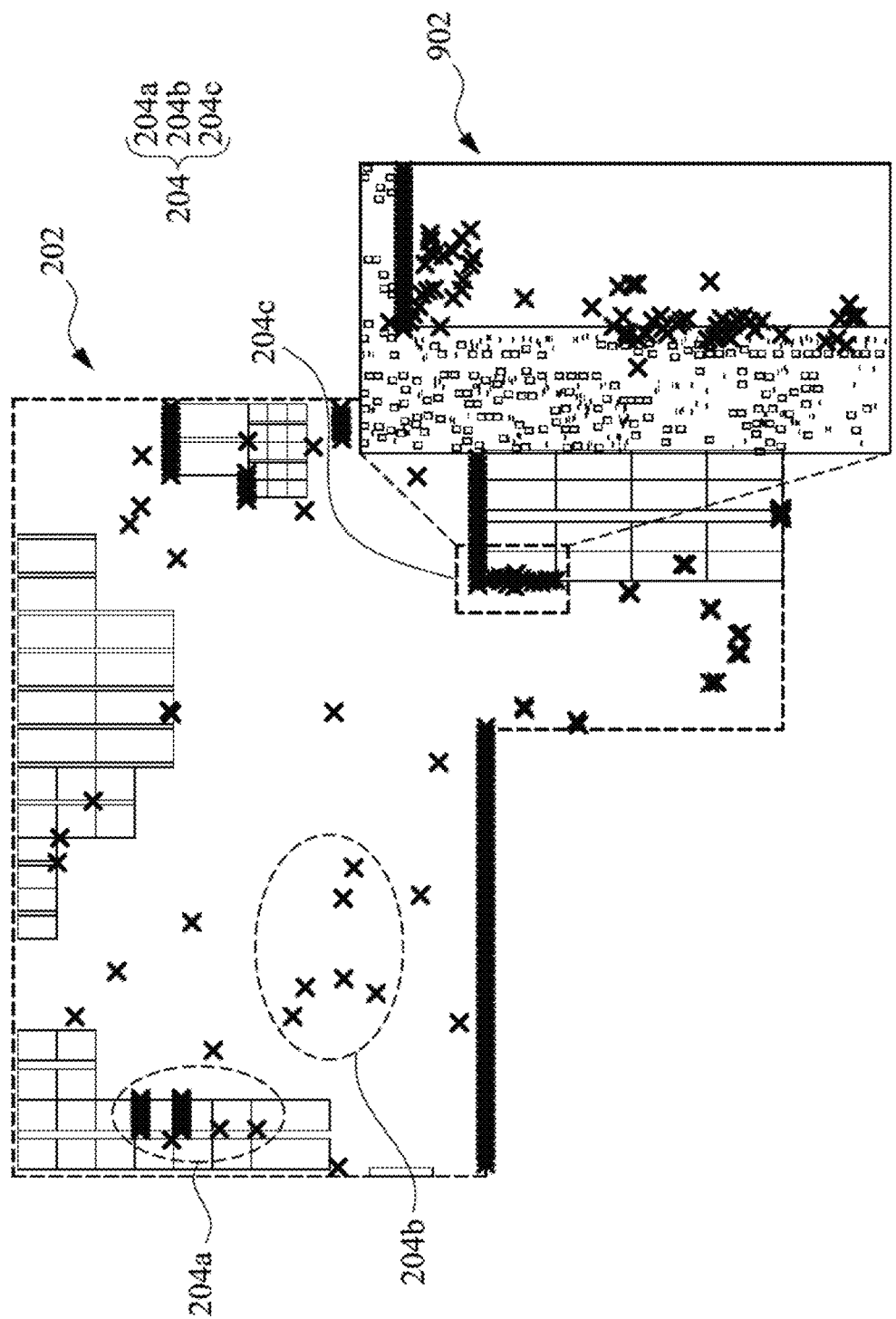
FIG. 2 is a diagram illustrating an example DRC-violation map in accordance with some embodiments.

FIG. 2 is a diagram illustrating an example DRC-violation map 202 in accordance with some embodiments. In this example, the DRC-violation map 202 includes DRC violations 204, associated with a specific electronic circuit placement layout, identified by the verification tool 28. The DRC violations 204 may be classified into three categories, namely structural DRC violations 204a, scatter DRC violations 204b, and cluster DRC violations 204c. Structural DRC violations 204a are DRC violations associated with structural factors such as wrong routing blockage creation, unfriendly input/output (I/O) pin setup, power ground (PG) violations. Structural DRC violations 204a are generally inapplicable to fix in engineering change order (ECO) manner and big changes at earlier stages are needed. Structural DRC violations 204a generally are fixed by users. Scatter DRC violations 204b are DRC violations that are scattered across the electronic circuit placement layout of the design. Scatter DRC violations 204b are generally associated with EDA router algorithms. Scatter DRC violations 204b are generally fixed by the EDA router or (automatic DRC violation fix) ADF tools, and the fix rate is generally around 85-95%. Scatter DRC violations 204b are not necessarily easy to fix. Some scatter DRC violations 204b may be hard-to-fix (HTF) DRC violations. Cluster DRC violations 204c are DRC violations that cluster around in a small region, as shown in FIG. 2. As shown in the enlarged portion in FIG. 2, there are many cluster DRC violations 204c located in a cluster box 902 in this example. Cluster DRC violations 204c are generally associated with factors such as insufficient routing resource, clustered complicated cell placement, and the like. Cluster DRC violations 204c are generally fixed by EDA router or ADF tools, and the fix rate is generally around 40-60%. Cluster DRC violations 204c are generally potential HTF DRC violations, but are not necessarily HTF DRC violations. Some cluster DRC violations 204c may not be HTF DRC violations.

Figure 3:
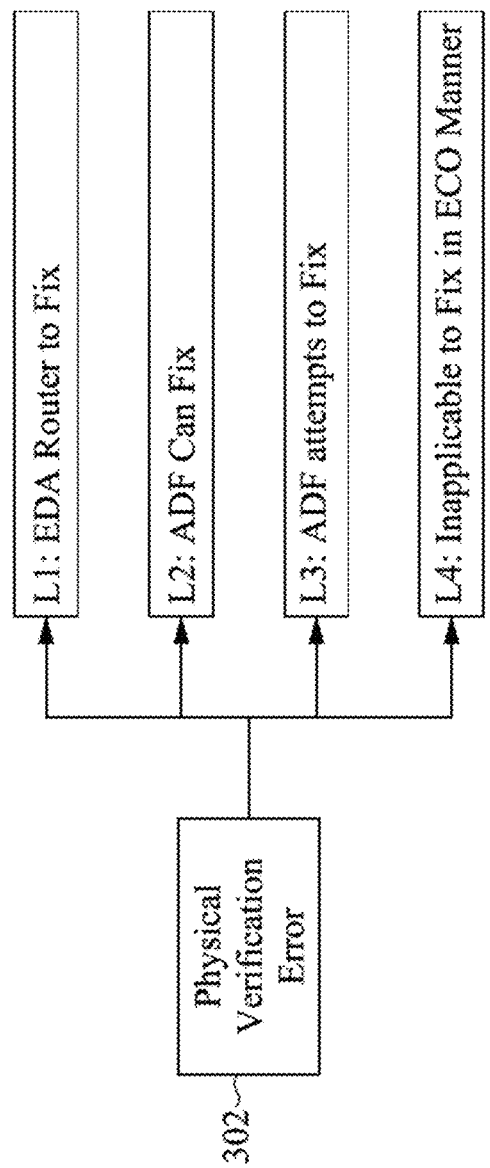
FIG. 3 is a diagram illustrating a classification of DRC violations in accordance with some embodiments.

FIG. 3 is a diagram illustrating a classification of DRC violations in accordance with some embodiments. In general, DRC violations may be classified into different fix difficulty levels to facilitate the post-routing congestion optimization process carried out by the post-routing congestion optimization platform 30. Based on physical verification error(s) 302, DRC violations are classified into four fix difficulty levels, namely L1, L2, L3, and L4. L1 DRC violations are DRC violations that can be fixed by the EDA router and have a medium to high fix rate depending on EDA router stability. L2 DRC violations are DRC violations that can be fixed by ADF tools and have a high fix rate. L1 and L2 DRC violations are not considered as HTF DRC violations. The scatter DRC violations 204b shown in FIG. 2 are candidates for L1 and L2 DRC violations.

On the other hand, L3 DRC violations are DRC violations that ADF tools attempt to fix and a high fix rate is not guaranteed. The cluster DRC violations 204c shown in FIG. 2 are candidates for L3 DRC violations. L4 DRC violations are DRC violations that are inapplicable to fix in ECO manner. Structural DRC violations 204a shown in FIG. 2 are often L4 DRC violations. L3 and L4 DRC violations are considered as HTF DRC violations.

Referring back to FIG. 1, the post-routing congestion optimization platform 30 is configured to optimize post-routing congestion in a particular electronic circuit placement layout (including physical interconnections between the cells or the geometric shapes in the placement layout produced by the routing tool 26) and fix DRC violations 204 accordingly.

As shown in the example of FIG. 1, the post-routing congestion optimization platform 30 may include, among other things, a classification engine 32, a post-routing congestion optimization engine 36, and an ECO tool 34. The post-routing congestion optimization engine 36 includes, among other things, a cell relocation engine 38, an anchor buffering engine 40, and a wire movement engine 42.

The classification engine 32 is configured to classify DRC violations into different fix difficulty levels (i.e., L1, L2, L3, and L4) to facilitate the post-routing congestion optimization process carried out by the post-routing congestion optimization engine 36. As mentioned above, scatter DRC violations 204b are not necessarily L1 or L2 DRC violations; cluster DRC violations 204c are not necessarily L3 DRC violations. If a L3 DRC violation is falsely classified as a L2 DRC violation, the ADF platform 30 might waste resources on fixing a DRC violation that has a low fix rate. As such, drawing the line between L2 DRC violations and L3 DRC violations and accurately predicting HTF DRC violations might increase the efficiency of the post-routing congestion optimization platform 30. In addition, the classification engine 32 is configured to generate cluster boxes 902 for cluster DRC violations 204c as shown in FIG. 2.

In a non-limiting example, artificial intelligence (AI) or machine learning (ML) techniques may be employed to identify the severity of DRC violations to predict whether a DRC violation is an HTF DRC violation. "Artificial intelligence (AI)" is used herein to broadly describe any computationally intelligent systems and methods that can learn knowledge (e.g., based on training data), and use such learned knowledge to adapt its approaches for solving one or more problems, for example, by making inferences based on a received input, such as placement layouts. "Machine learning (ML)" generally refers to a sub-field or category of artificial intelligence, and is used herein to broadly describe any algorithms, mathematical models, statistical models, or the like that are implemented in one or more computer systems or circuitry, such as processing circuitry, and which build one or more models based on sample data (or training data) in order to make predictions or decisions.

Specifically, an HTF DRC violation prediction platform, which utilizes the machine learning techniques, may predict the presence of HTF DRC violations, among all DRC violations (i.e., DRC violations include HTF DRC violations and non-FTF DRC violations), by implementing one or more machine learning approaches, for example, in which past data (such as data indicating presence and/or locations of HTF DRC violations in electronic device designs) is utilized to train a machine learning model to predict the presence of DRC violations based on similarities or deviations between new electronic circuit placement layouts and the past data.

As will be discussed in further detail herein, the post-routing congestion optimization engine 36 is configured to select an optimization plan 37 to optimize the post-routing congestion, based on the L3 DRC violations 204c and cluster boxes 902 generated by the classification engine 32. The cell relocation engine 38, the anchor buffering engine 40, and the wire movement 42 can be utilized, alone or in combination, to optimize the post-routing congestion, based on the optimization plan 37 selected by the post-routing congestion optimization engine 36. In a non-limiting example, the cell relocation engine 38 is utilized according to the optimization plan 37. In another non-limiting example, the anchor buffering engine 40 is utilized according to the optimization plan 37. In another non-limiting example, both the cell relocation engine 38 and the anchor buffering engine 40 are utilized according to the optimization plan 37. In yet another non-limiting example, the cell relocation engine 38, the anchor buffering engine 40, and the wire movement engine 42 are utilized according to the optimization plan 37. The optimization plan 37 is selected based on the input (i.e., the output of the classification engine 32) of the post-routing congestion optimization engine 36. Different landscapes of L3 DRC violations 204c and cluster boxes 902 lead to different optimization plans 37.

The ECO tool 34 is configured to fix DRC violations 204 accordingly according to the optimization plan 37. As will be described in detail herein, the cell relocation engine 38, the anchor buffering engine 40, and the wire movement engine 42 may generate ECO documents to be used by the ECO tool 34.

The post-routing congestion optimization platform 30 may include a plurality of electronic device analysis and/or design tools which may be implemented at least in part as software tools which, when executed by one or more computing devices, processors, or the like, can be utilized to analyze one or more electronic circuit placement layouts, which may be received, for example, from the electronic design platform 20 (e.g., from the placement tool 24). Additionally, in some embodiments, the post-routing congestion optimization platform 30 may be utilized to adjust or otherwise provide information to the electronic design platform 20 which indicates one or more adjustments to be made to the placement layout in order to avoid or otherwise reduce the presence of DRC violations in the placement layout.

Figure 14:
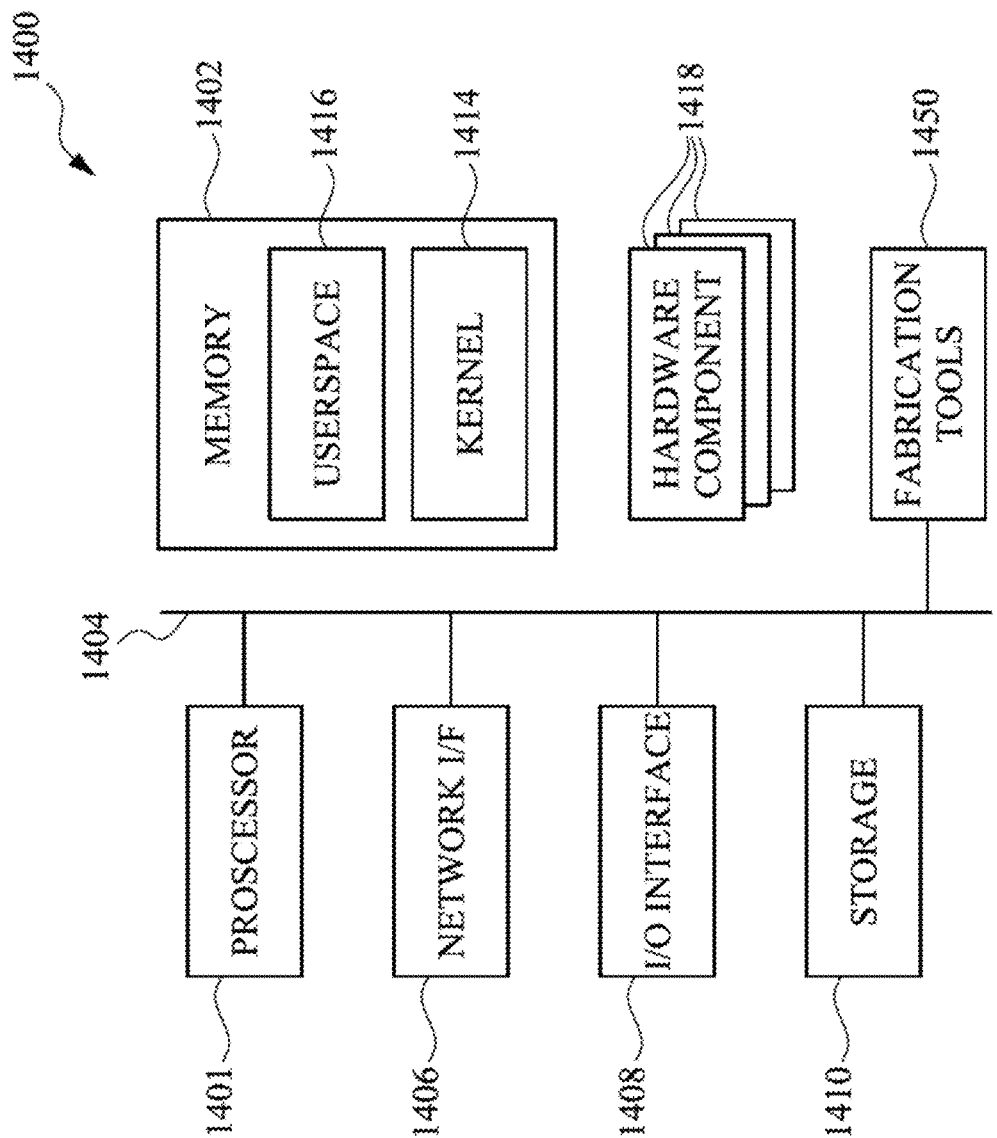
FIG. 14 is a block diagram of a computer system in accordance with some embodiments.

In some embodiments, the classification engine 32, the post-routing congestion optimization engine 32, and the ECO tool 34 may be implemented at least in part as software tools accessible to and executable by one or more computing systems as shown in FIG. 14, processors or the like. In some embodiments, the classification engine 32, the post-routing congestion optimization engine 32, and the ECO tool 34 may be implemented as circuitry operable to perform any of the functions described herein with respect to the classification engine 32, the post-routing congestion optimization engine 32, and the ECO tool 34. In some embodiments, the electronic design platform 20 and the post-routing congestion optimization platform 30 may be integrated, and may be implemented in a same platform. For example, each of the various tools described herein with respect to the electronic design platform 20 and the post-routing congestion optimization platform 30 may be accessed or otherwise implemented, at least in part, by a same apparatus, such as a computer device.

Figure 4:
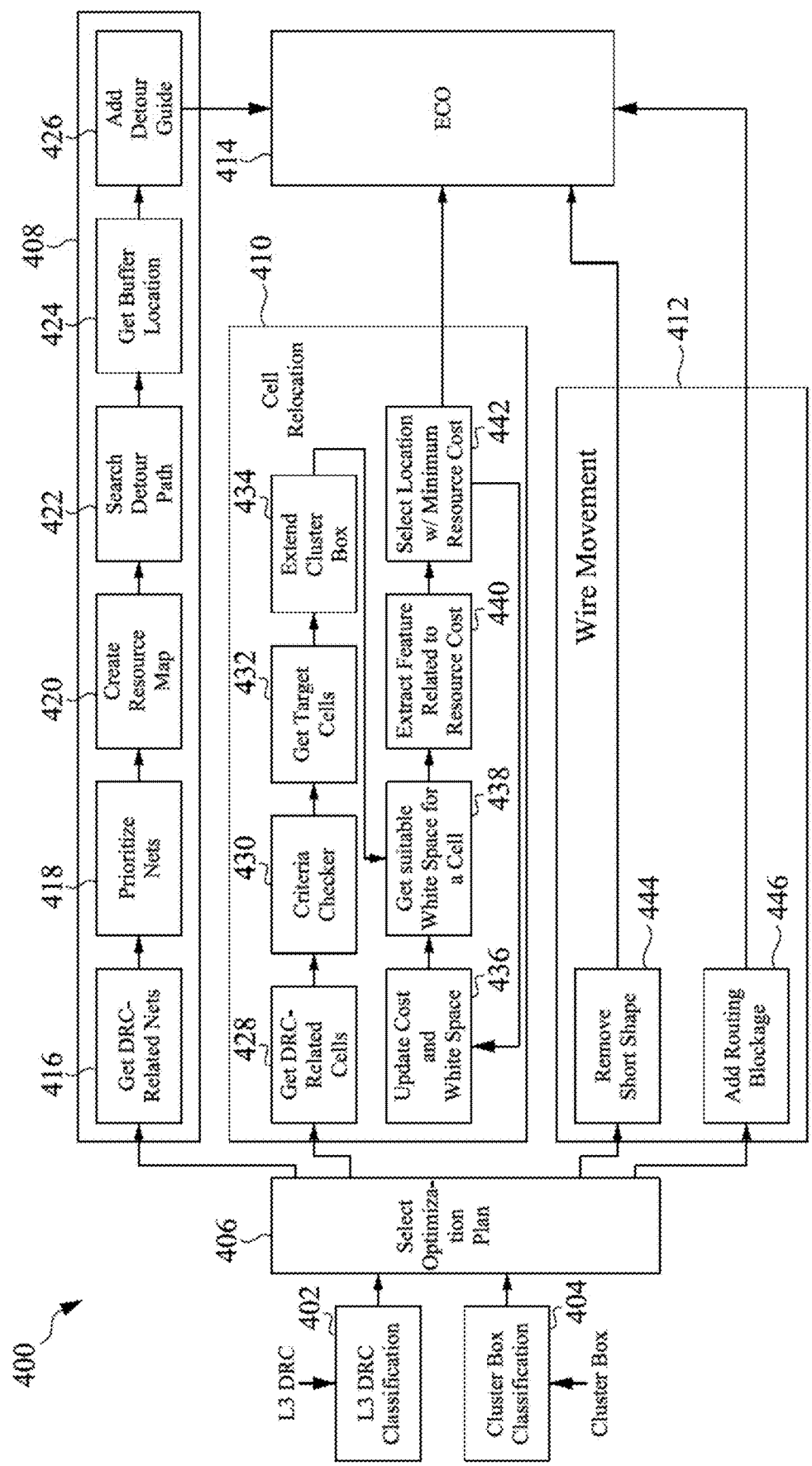
FIG. 4 is a flow chart illustrating a method of post-routing congestion optimization in accordance with some embodiments.

FIG. 4 is a flow chart illustrating a method 440 of post-routing congestion optimization in accordance with some embodiments. The method 440 may be carried out by the post-routing congestion optimization platform 30. In general, the optimization plan 37 is selected based on input (i.e., L3 DRC violation classification and cluster box classification) received from the classification engine 32; cell relocation 410, anchor buffering 408, and wire movement 412 may be used based on the optimization plan 37 as needed; the ECO tool 34 may utilize the ECO document generated to fix DRC violations.

The post-routing congestion optimization engine 36 receives DRC violation information on a chip from the classification engine 32. In one example, the DRC violation information includes, among other things, information on cluster DRC violations 204c and information on cluster boxes 902. At step 402, the post-routing congestion optimization engine 36 receives the information on cluster DRC violations 204c. At step 404, the post-routing congestion optimization engine 36 receives the information on cluster boxes 902. In another example, the DRC violation information includes, among other things, information on L3 DRC violations and the information on cluster boxes 902.

At step 406, the post-routing congestion optimization engine 36 then select or generate the optimization plan 37 as shown in FIG. 1 based on the input (i.e., the output of the classification engine 32) of the post-routing congestion optimization engine 36 received at step 402 and step 404. In other words, the selected or generated optimization plan 37 are customed for different output of the classification engine 32. For instance, cell relocation 410 carried out by the cell relocation engine 38 may be the optimization plan 37 for some output of the classification engine 32; anchor buffering 408 carried out by the anchor buffer engine 40 may be the optimization plan 37 for other output of the classification engine 32. Sometimes, a combination of at least two of the cell relocation 410, the anchor buffering 408, and the wire movement 412 may be the optimization plan 37 when the cell relocation 410 or the anchor buffering 408 alone still cannot fix the cluster DRC violations 204c. Details of the cell relocation 410 will be described below with reference to FIGS. 5-8B. Details of the anchor buffering 408 will be described below with reference to FIGS. 9-13. At step 414, the ECO tool 34 may utilize the ECO document generated, often in the form of a *.tcl file, to fix cluster DRC violations 204c.

Figure 5:
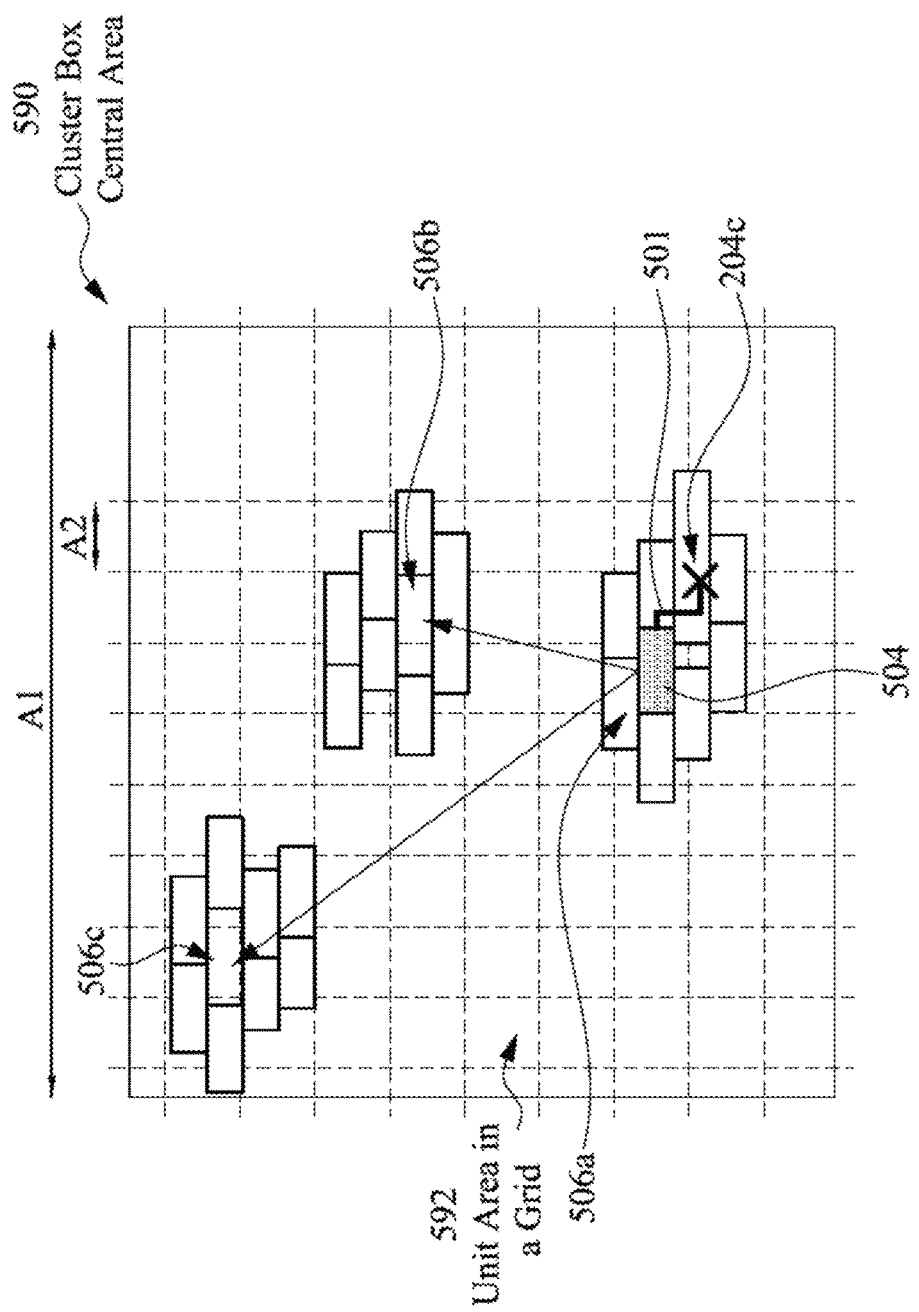
FIG. 5 is a diagram illustrating cell relocation in accordance with some embodiments.
Figure 6:
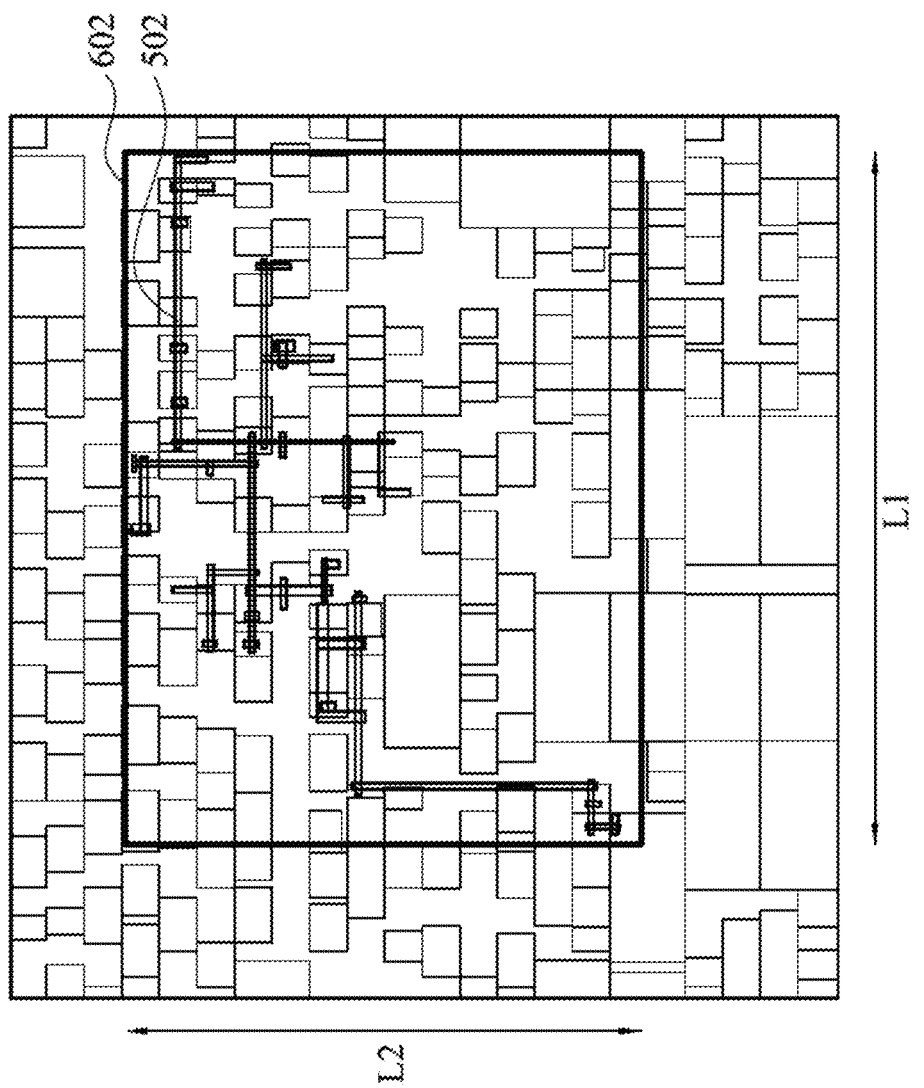
FIG. 6 is a diagram illustrating calculation of a connection net box in accordance with some embodiments.
Figure 7A:
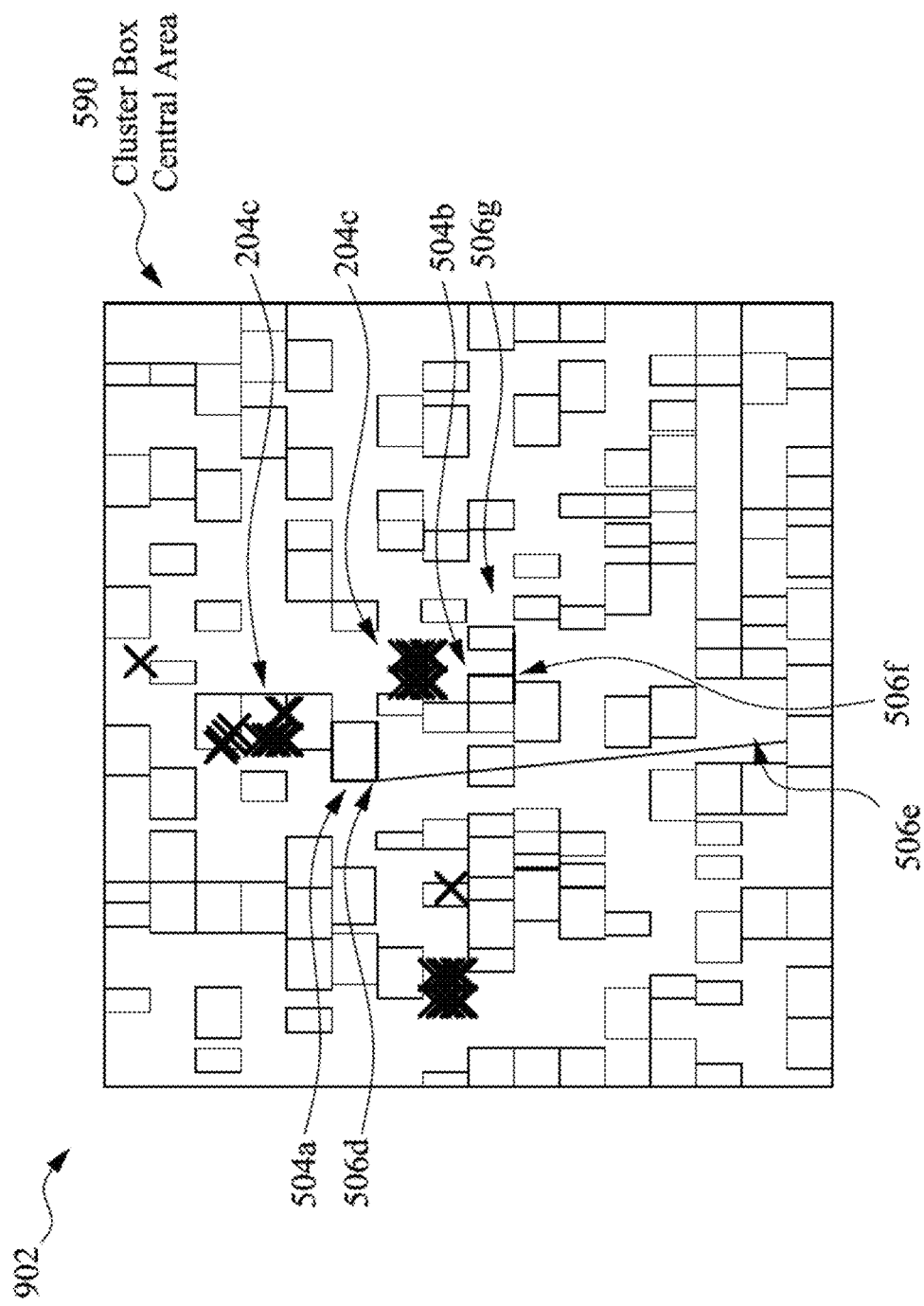
FIG. 7A is a diagram illustrating two target cells before cell relocation in accordance with some embodiments.
Figure 7B:
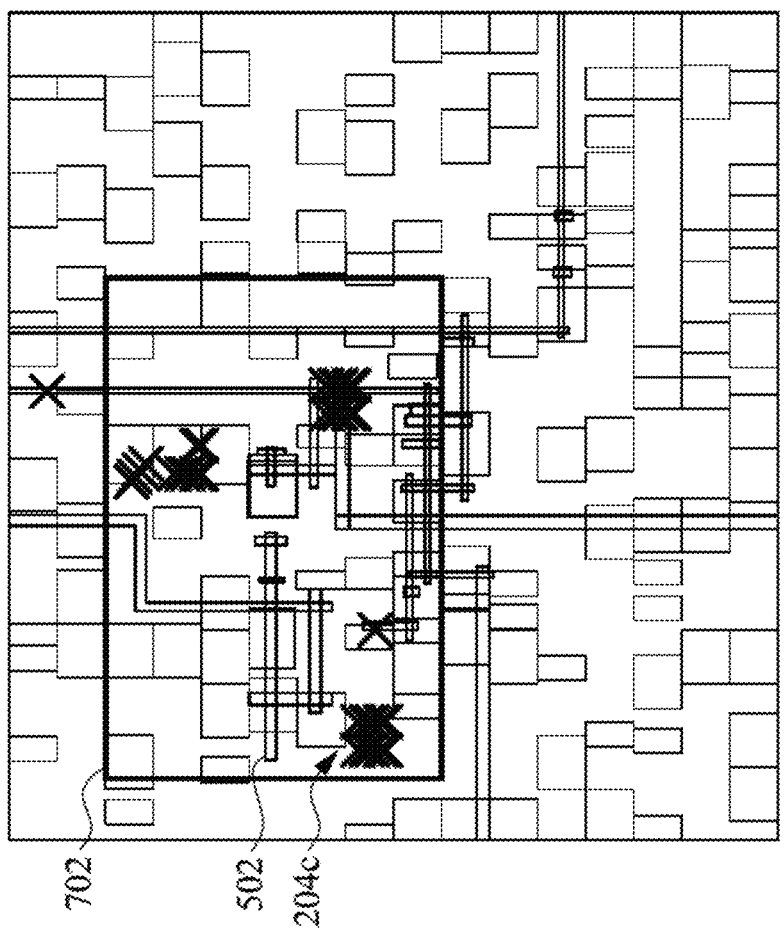
FIG. 7B is a diagram illustrating the two target cells of FIG. 7A with a connection net in accordance with some embodiments.
Figure 8A:
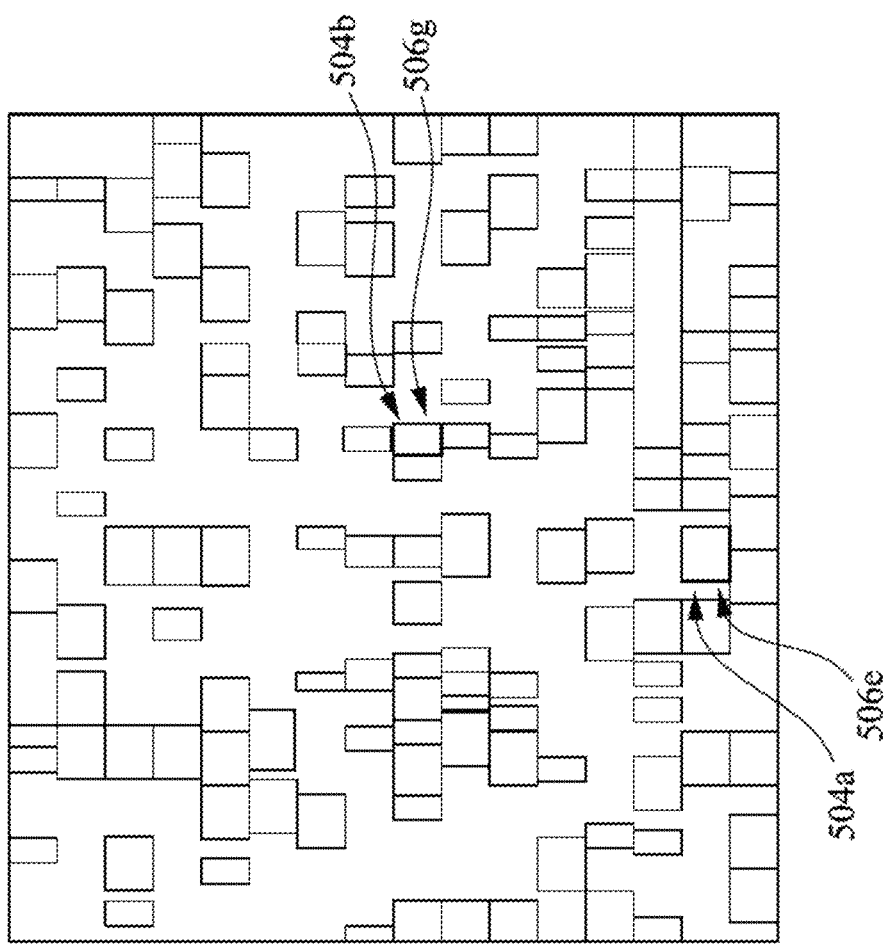
FIG. 8A is a diagram illustrating the two target cells of FIG. 7A after cell relocation in accordance with some embodiments.
Figure 8B:
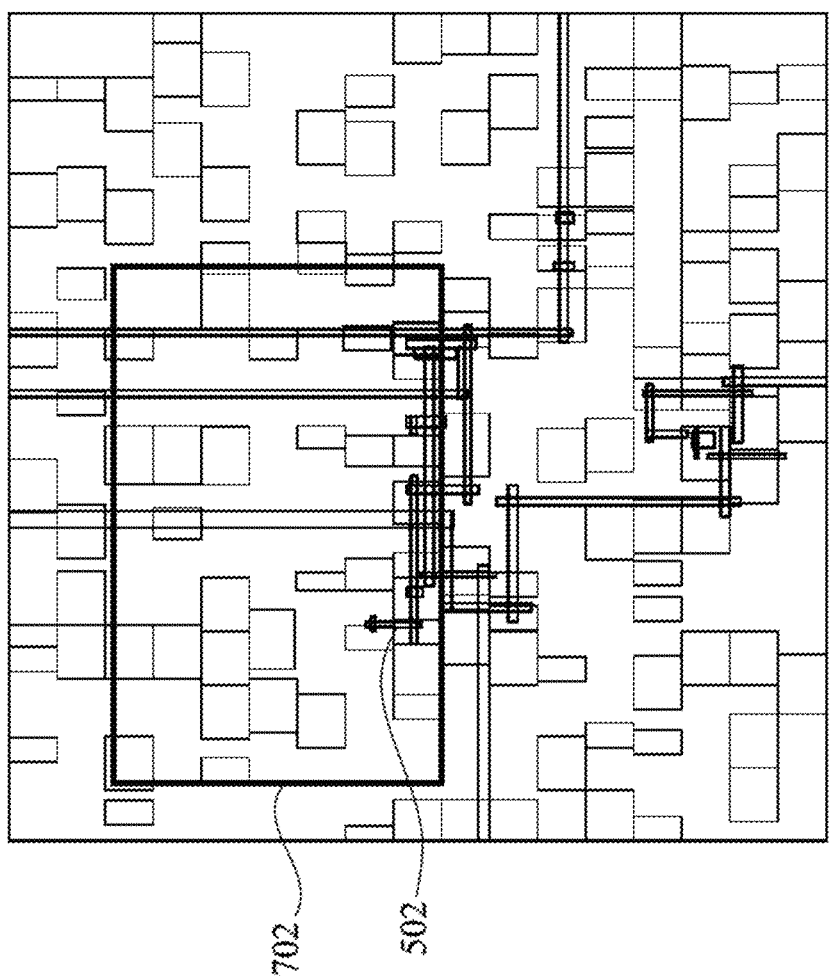
FIG. 8B is a diagram illustrating the two target cells of FIG. 7A after cell relocation with a connection net in accordance with some embodiments.

FIG. 5 is a diagram illustrating cell relocation 410 in accordance with some embodiments. FIG. 6 is a diagram illustrating calculation of a connection net box in accordance with some embodiments. FIG. 7A is a diagram illustrating two target cells before cell relocation 410 in accordance with some embodiments. FIG. 7B is a diagram illustrating the two target cells of FIG. 7A before cell relocation 410 with a connection net in accordance with some embodiments. FIG. 8A is a diagram illustrating the two target cells of FIG. 7A after cell relocation 410 in accordance with some embodiments. FIG. 8B is a diagram illustrating the two target cells of FIG. 7A after cell relocation 410 with a connection net in accordance with some embodiments.

As shown in FIG. 4 and FIG. 5, multiple DRC violations 204 are identified on an IC layout at step 428. At step 430, a criteria checker may be used to identify different classifications of the multiple DRC violations 204 at step 430. For example, the criteria checker may identify all cluster DRC violations 204c located in a cluster box 902. As shown in the example of FIG. 5, a cluster DRC violation 204c is identified in a cluster box 902. Specifically, the cluster DRC violation 204c is identified in a cluster box central area 590. The cluster box central area 590 is a square with a side length A1. In one non-limiting example, the side length A is 10 µm. The cluster box central area 590 can be divided into multiple unit areas 592 in a grid. Each unit area 592 is a square with a side length A2. In one non-limiting example, the side length A2 is 1 µm. Thus, the cluster box central area 590 includes 100 unit areas 592 in the grid.

A target cell 504 at an original location 506a, as shown in FIG. 5, is located at step 432. In one implementation, the target cell 504 is located using a connection net 501 that electrically connects the cluster DRC violation 204c and the target cell 504. The connection net 501 is a connection path composed of one or more metal tracks located in one or more metal layers (e.g., the first metal layer M1 and the second metal layer M2). In some example, the connection net 501 further includes vertical interconnect accesses (vias) connecting those metal tracks in different metal layers in the vertical direction. Multiple connection net 501 collectively are referred to as a connection net distribution 502 as shown in FIG. 6 below. In other words, the target cell 504 is located by searching along a connection net 501 that is connected to the cluster DRC violation 204c.

At step 438, multiple candidate locations in the cluster box 902 are detected. Candidate locations are locations where the target cell 504 may be relocated. Candidate locations are generally locations with low DRC violation densities and little routing congestion, sometimes referred to as white spaces. In the example of FIG. 5, two candidate locations 506b and 506c are detected. In other words, the target cell 506a may be relocated to either the candidate location 506b or the candidate location 506c.

At step 440, features related to the candidate locations are extracted. In one implementation, features are extracted using the feature extraction tool 25 shown in FIG. 1. Based on the features related to the candidate locations extracted at step 440, resource costs associated with the candidate locations can be calculated. In the example shown in FIG. 5, the resource cost for candidate location 506b and the resource cost for candidate location 506c are both calculated. The resource cost for the original location 506a may also be calculated. The Resource cost is a measure of routing resource in a particular area. In one embodiment, the resource cost is related to three factors: (i) the DRC violation density; (2) the connection net distribution; and (iii) the non-default rule (NDR) aware metal layer density. In one implementation, the resource cost is a sum of the product of the three factors, calculated in each unit area 592.

In one example, the connection net distribution is measured by a "connection net box," which is calculated as (L1*L2)/(L1+L2), where L1 and L2 are the length and height of a rectangular covering the connection net distribution, respectively. In the example shown in FIG. 6, the rectangular 602 that covers the connection net distribution 502 has a length L1 equal to 8 µm and a height L2 equal to 6 µm. As such, the connection net box is equal to (8*6)/(8+6) µm. It should be noted that the resource cost may be related to factors other than the three described above in other embodiments.

In one embodiment, the features extracted are adjustable. In a non-limiting example, metal layer densities for metal zero (M0) layer to metal three (M3) layer are extracted if the cluster DRC violation 204c is on a low metal layer (e.g., metal one (M1) layer), while metal layer densities for metal four (M4) layer to metal ten (M10) layer are extracted if the cluster DRC violation 204c is on a middle or high metal layer (e.g., metal eight (M8) layer). In other words, when the cluster DRC violation 204c is on a low metal layer, the most relevant features are metal layer densities for M0 layer to M3 layer; when the cluster DRC violation 204c is on a middle or high metal layer, the most relevant features are metal layer densities for M4 layer to M10 layer.

At step 442, a relocation location associated with a minimum resource cost is determined or selected, among the multiple candidate locations. In the example of FIG. 5, the resource cost associated with the candidate location 506b is lower than that associated with the candidate location 506c and that associated with the original location 506a. Therefore, the candidate position 506b is determined or selected to be the relocation location. If the resource cost associated with any candidate location is higher than that associated with the original location, meaning that there is no ideal candidate location, the cluster box may be extended to permit more candidate locations to be considered.

Then, the target cell 506a can be relocated from the original location 506a to the relocation location, which is the candidate location 506b in the example shown in FIG. 5. Information on the IC layout after the relocation such as resource cost and white space is updated at step 436. The process can proceed to identify another target cell and repeat the steps described above and relocate that target cell in a similar manner. At the end of the process, an ECO document is generated reflecting all relocations on the IC layout. The ECO tool 34 may utilize the generated ECO document to fix cluster DRC violations 204c.

An example cell relocation is shown in FIGS. 7A-8B. As shown in FIG. 7A, two target cells 504a and 504b are located at step 432, based on the information on cluster DRC violations 204c. The target cell 504a has an original location 506d. After step 442, a relocation location 506e associated with a minimum resource cost is determined or selected. Likewise, the target cell 504b has an original location 506f. After step 442, a relocation location 506g associated with a minimum resource cost is determined or selected. As shown in FIG. 8A, the target cell 504a is relocated to the relocation location 506e after the cell relocation, and the target cell 504b is relocated to the relocation location 506g after the cell relocation. In other words, by relocating the target cell 504a from the original location 506d to the relocation location 506e and relocating the target cell 504b from the original location 506f to the relocation location 506g, as shown in FIG. 8A, the overall resource cost is reduced, therefore mitigating the post-routing congestion.

As shown in FIG. 7B, there are many cluster DRC violations 204c and complicated connection net distribution 502 in the region 702, indicating that the routing congestion in the region 702 is severe. In contrast, as shown in FIG. 8B, there are no cluster DRC violations 204c and less complicated connection net distribution 502 in the region, indicating that the routing congestion in the region 702 has been improved after cell relocation.

It should be noted that the cell relocation 410 may also be applied to scatter DRC violations 204b. When a scatter DRC violation 204b is identified, a central area centered on the scatter DRC violation 204b is established instead of the cluster box central area 590 as shown in FIG. 5. The central area may have a size smaller than the cluster box central area 590 as shown in FIG. 5, and the size is configurable as needed. Resource cost is maintained for each candidate location, and a relocation location is determined or selected among multiple candidate locations.

Figure 12:
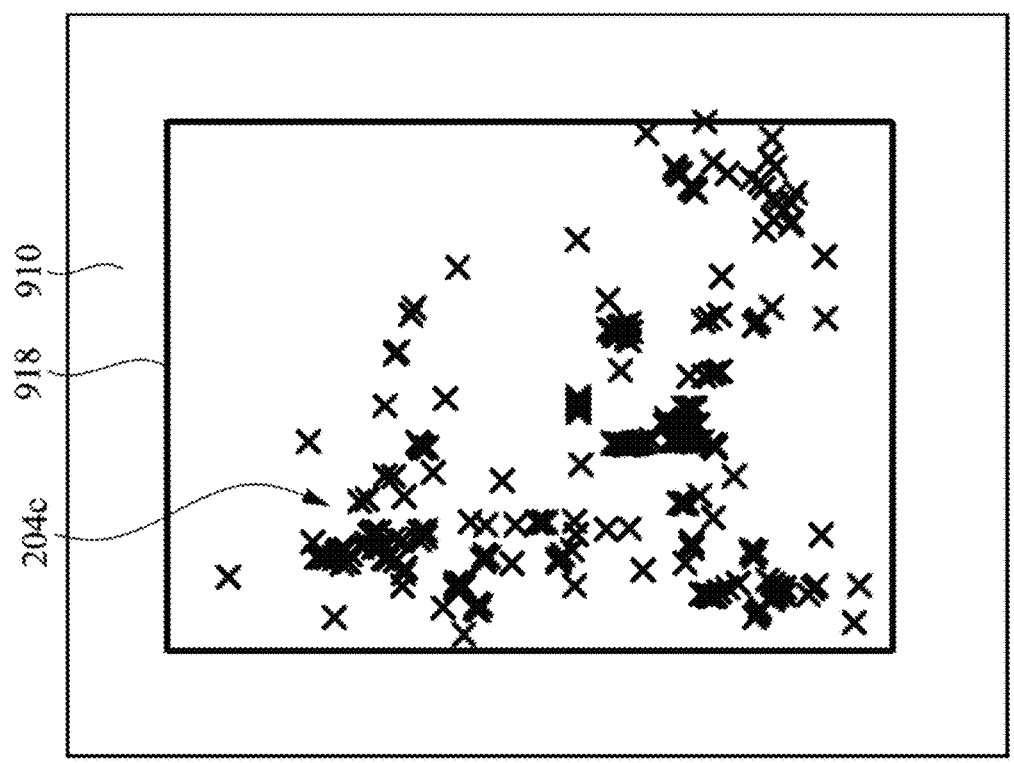
FIG. 12 is a diagram illustrating cluster DRC violations before anchor buffering in accordance with some embodiments.
Figure 13:
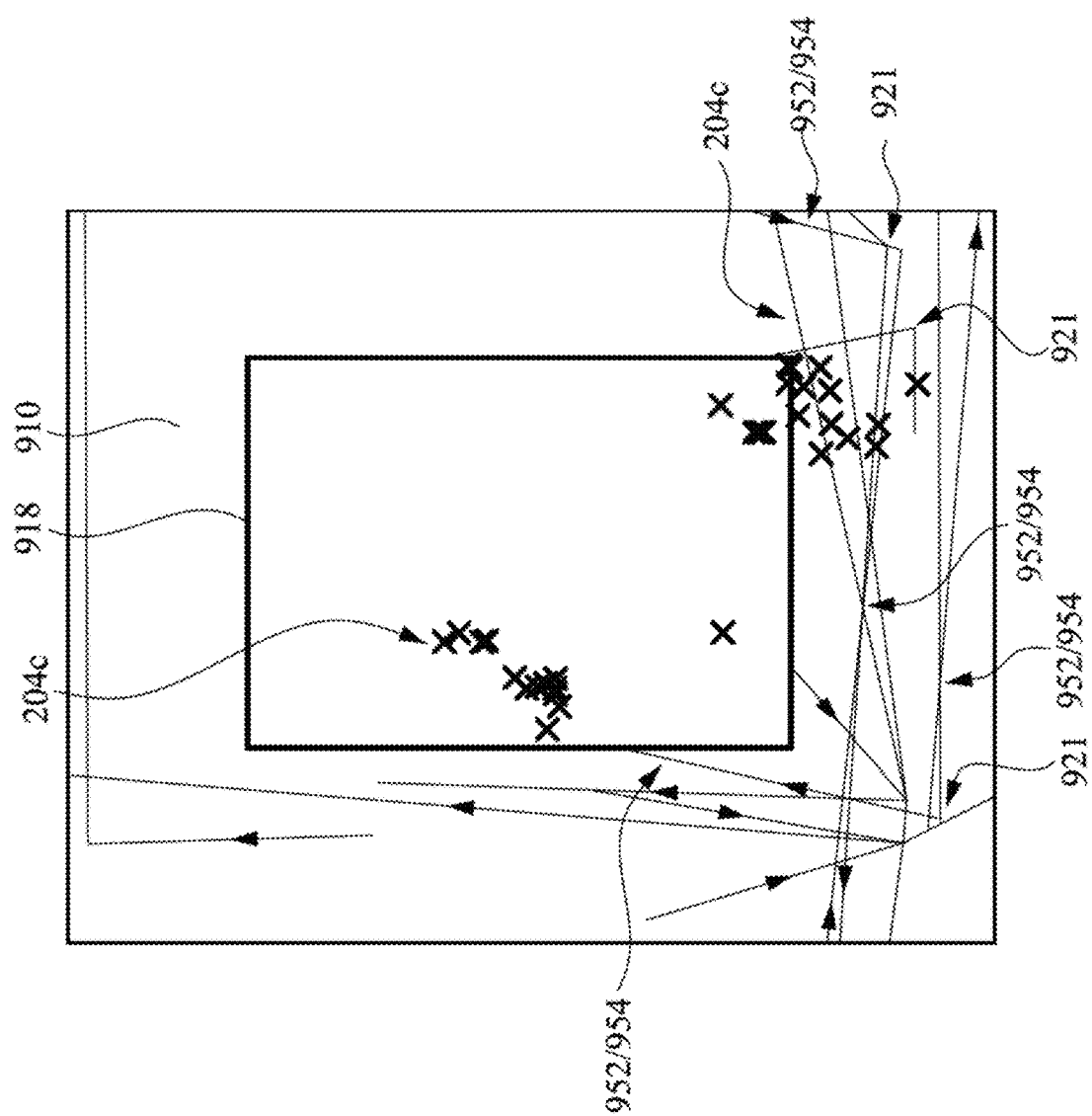
FIG. 13 is a diagram illustrating cluster DRC violations of FIG. 12 after anchor buffering in accordance with some embodiments.

FIG. 9 is a diagram illustrating anchor buffering 408 in accordance with some embodiments. FIG. 10 is a diagram illustrating anchor buffering 408 in accordance with some embodiments. FIG. 11 is a diagram illustrating anchor buffering 408 in accordance with some embodiments. FIG. 12 is a diagram illustrating cluster DRC violations 204c before anchor buffering 408 in accordance with some embodiments. FIG. 13 is a diagram illustrating cluster DRC violations 204c of FIG. 12 after anchor buffering 408 in accordance with some embodiments.

As shown in FIG. 4, the anchor buffering 408 may start at step 416, where connection net distribution related to DRC violations are obtained. At step 418, connection nets are prioritized based on DRC violations. For example, connection nets related to cluster DRC violations are prioritized. At step 420, resource maps are created. Resource maps reflect routing resources at different locations.

As shown in FIG. 9, a blockage area 910 on an IC layout is identified. A routing congestion box 918 is located in the blockage area 910. There are multiple cluster DRC violations 204c inside the routing congestion box 918. As shown in FIG. 4 and FIG. 9, a detour path 912 is generated at step 422. In the example of FIG. 9, the detour path 912 has a first endpoint (also referred to as a first instance term) 914 and a second endpoint (also referred to as a second instance term) 916, and the detour path 912 is the shortest path surrounding the blockage area 910 that connects the first endpoint 914 and the second endpoint 916.

As shown in FIG. 10, multiple candidate points 920a, 920b, 920c, 920d, 920e (collectively, 920) are identified on the detour path 912. Candidate points 920 are candidate locations for a buffer anchor on the detour path 912. It should be noted that the five candidate points 920 shown in FIG. 10 is just one example and other candidate points 920 may be identified with different locations. For each candidate point 920, a first fly line 952 connecting the candidate point 920 and the first endpoint 914 and a second fly line 954 connecting the candidate point 920 and the second endpoint 914 are generated.

As shown in FIG. 10 and FIG. 4, at step 424, an anchor buffer 921 is selected, among the candidate points 920, such that the first fly line 952 and the second fly line 954 do not cross the routing congestion box 918. In the example of FIG. 10, the candidate point 920c is selected to be the anchor buffer 921. It should be noted that it is possible in other examples that more than one candidate points 920 are eligible to be an anchor buffer 921, in other words, having a first fly line 952 and a second fly line 954 that do not cross the routing congestion box 918. The location of the selected anchor buffer 921, the candidate point 920c in the example of FIG. 10, is stored. The location of the selected anchor buffer 921 may be used by the ECO tool 34.

As shown in FIG. 11, two rectangles 922 and 924 are generated. The rectangle 922 is a rectangle that has two opposite vertices: the anchor buffer 921 and the first endpoint 914. The rectangle 924 is a rectangle that has two opposite vertices: the anchor buffer 921 and the second endpoint 916. It is determined whether the two rectangles 922 and 924 overlap with the routing congestion box 918. In the example of FIG. 11, both of the rectangles 922 and 924 overlap with the routing congestion box 918. As a result, at step 426, a detour guide is generated and may be used by the ECO tool 34. The detour guide provides guidelines/instructions that can be used by the ECO tool 34 to avoid any routing path in the triangular areas 922b and 924b, respectively. In other words, the detour guide specifies that the triangular areas 922a and 924a, namely a half of the rectangle 922 and a half of the rectangle 924, can be used for routing path. The detour guide, therefore, can mitigate routing congestion in the routing congestion box 918.

It should be noted that steps 420, 422, 424, and 426 can be repeated as needed. In other words, multiple detour paths can be identified, multiple corresponding anchor buffers can be selected with their locations stored to be used by the ECO tool 34. Each time a new anchor buffer is selected, the resource map is updated. The process may keep going until the remaining routing resource in a certain area (e.g., the triangle area 924a shown in FIG. 11) is not enough or becomes exhausted.

As shown in FIG. 12 and FIG. 13, the number of cluster DRC violations 204c located in the routing congestion box 918 decreases after the anchor buffering 408. In other words, the post-routing congestion in the routing congestion box 918 has been optimized. As shown in FIG. 13, multiple anchor buffers 921 have been inserted or selected, and corresponding fly lines 952/954 have been generated. As a result, the ECO tool 34 can utilize the locations of these anchor buffers 921 and corresponding detour guides to optimize the post-routing congestion.

Referring back to FIG. 4, wire movement 412 may also be employed, especially when anchor buffering 408 and cell relocation 410, used alone or in combination, are still not enough. In one implementation, a routing blockage may be added to tell the DEA tool to avoid the routing blockage, at step 446. Adding routing blockage is often useful in situations where there is no white space left to relocate the target cell or the resource cost actually increases rather than decreases after the cell relocation. In another implementation, a short shape may be removed from the IC layout, at step 444. It should be noted that implementations other than adding routing blockage at step 446 and removing short shapes at step 444 are within the scope of the disclosure.

Using the post-routing congestion optimization platform 30 which carries out the method 440 of post-routing congestion optimization shown in FIG. 4 can significantly reduce DRC violations on an IC layout. In one example, an IC layout originally having 501 DRC violations has only 116 DRC violations (i.e., a reduction of 76.85%) after optimization using the post-routing congestion optimization platform 30, compared to 464 DRC violations (i.e., a reduction of 7.39%) after a conventional optimization. In another example, an IC layout originally having 451 DRC violations has only 85 DRC violations (i.e., a reduction of 81.16%) after optimization using the post-routing congestion optimization platform 30, compared to 354 DRC violations (i.e., a reduction of 21.5%) after a conventional optimization.

On the other hand, using the post-routing congestion optimization platform 30 which carries out the method 440 of post-routing congestion optimization shown in FIG. 4 can significantly boost fix rates on an IC layout. In one example, an IC layout originally having a L3 DRC violation fix rate of 30.69% using a conventional optimization now has a L3 DRC violation fix rate of 41.58% after optimization using the post-routing congestion optimization platform 30. In another example, an IC layout originally having a L3 DRC violation fix rate of 46.44% using a conventional optimization now has a L3 DRC violation fix rate of 75.09% after optimization using the post-routing congestion optimization platform 30. L2 DRC violation fix rate and L1 DRC violation fix rate become higher as well after optimization using the post-routing congestion optimization platform 30.

FIG. 14 is a block diagram of a computer system 1400 in accordance with some embodiments. One or more of the tools and/or systems and/or operations described with respect to FIGS. 1-13 are realized in some embodiments by one or more computer systems 1400 of FIG. 14. The system 1400 comprises a processor 1401, a memory 1402, a network interface (I/F) 1406, a storage 1410, an input/output (I/O) device 1408, and one or more hardware components 1418 communicatively coupled via a bus 1404 or other interconnection communication mechanism.

The memory 1402 includes, in some embodiments, a random access memory (RAM) and/or other dynamic storage device and/or read only memory (ROM) and/or other static storage device, coupled to the bus 1404 for storing data and/or (processing) instructions to be executed by the processor 1401, e.g., kernel 1414, userspace 1416, portions of the kernel and/or the userspace, and components thereof. The memory 1402 is also used, in some embodiments, for storing temporary variables or other intermediate information during execution of instructions to be executed by the processor 1401.

In some embodiments, a storage device 1410, such as a magnetic disk or optical disk, is coupled to the bus 1404 for storing data and/or instructions, e.g., kernel 1414, userspace 1416, etc. The I/O device 1408 comprises an input device, an output device and/or a combined input/output device for enabling user interaction with the system 1400. An input device comprises, for example, a keyboard, keypad, mouse, trackball, trackpad, and/or cursor direction keys for communicating information and commands to the processor 1401. An output device comprises, for example, a display, a printer, a voice synthesizer, etc. for communicating information to a user.

In some embodiments, one or more operations and/or functionality of the tools and/or systems described with respect to FIGS. 1-13 are realized by the processor 1401, which is programmed for performing such operations and/or functionality. One or more of the memory 1402, the I/F 1406, the storage 1410, the I/O device 1408, the hardware components 1418, and the bus 1404 are operable to receive instructions, data, design rules, netlists, layouts, models and/or other parameters for processing by the processor 1401.

In some embodiments, one or more of the operations and/or functionality of the tools and/or systems described with respect to FIGS. 1-14 are implemented by specifically configured hardware (e.g., by one or more application specific integrated circuits or ASIC(s)) which are included) separate from or in lieu of the processor 1401. Some embodiments incorporate more than one of the described operations and/or functionality in a single ASIC.

In some embodiments, the operations and/or functionality are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or other suitable non-transitory computer readable recording medium.

The computer system 1400 may further include fabrication tools 1450 for implementing the processes and/or methods stored in the storage 1410. For instance, a synthesis may be performed on a design in which the behavior and/or functions desired from the design are transformed to a functionally equivalent logic gate-level circuit description by matching the design to standard cells selected from a layout unit library. The synthesis results in a functionally equivalent logic gate-level circuit description, such as a gate-level netlist. Based on the gate-level netlist, a photolithographic mask may be generated that is used to fabricate the integrated circuit by the fabrication tools 1450. Further aspects of device fabrication are disclosed in conjunction with FIG. 15, which is a block diagram of IC manufacturing system 1500, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using the manufacturing system 1500.

Figure 15:
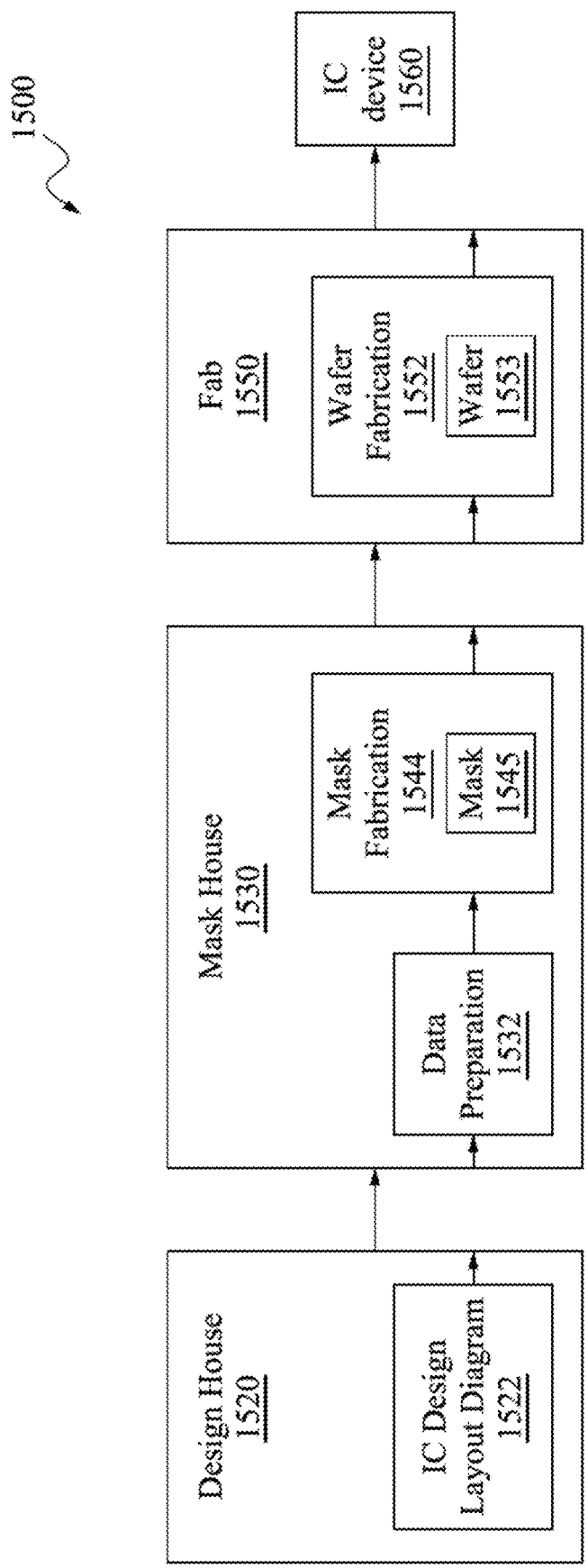
FIG. 15 is a block diagram of IC manufacturing system in accordance with some embodiments.

FIG. 15 is a block diagram of IC manufacturing system 1500 in accordance with some embodiments. In FIG. 15, the IC manufacturing system 1500 includes entities, such as a design house 1520, a mask house 1530, and an IC manufacturer/fabricator ("fab") 1550, that interact with one another in the design, development, and manufacturing cycles and/or services related to manufacturing an IC device 1560. The entities in the system 1500 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of the design house 1520, mask house 1530, and IC fab 1550 is owned by a single larger company. In some embodiments, two or more of design house 1520, mask house 1530, and IC fab 1550 coexist in a common facility and use common resources.

The design house (or design team) 1520 generates an IC design layout diagram 1522. The IC design layout diagram 1522 includes various geometrical patterns, or IC layout diagrams designed for an IC device 1560. The geometrical patterns correspond to patterns of metal, oxide, or semiconductor layers that make up the various components of IC device 1560 to be fabricated. The various layers combine to form various IC features. For example, a portion of the IC design layout diagram 1522 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. The design house 1520 implements a design procedure to form an IC design layout diagram 1522. The design procedure includes one or more of logic design, physical design or place and route. The IC design layout diagram 1522 is presented in one or more data files having information of the geometrical patterns. For example, IC design layout diagram 1522 can be expressed in a GDSII file format or DFII file format.

The mask house 1530 includes a data preparation 1532 and a mask fabrication 1544. The mask house 1530 uses the IC design layout diagram 1522 to manufacture one or more masks 1545 to be used for fabricating the various layers of the IC device 1560 according to the IC design layout diagram 1522. The mask house 1530 performs mask data preparation 1532, where the IC design layout diagram 1522 is translated into a representative data file ("RDF"). The mask data preparation 1532 provides the RDF to the mask fabrication 1544. The mask fabrication 1544 includes a mask writer. A mask writer converts the RDF to an image on a substrate, such as a mask (reticle) 1545 or a semiconductor wafer 1553. The design layout diagram 1522 is manipulated by the mask data preparation 1532 to comply with particular characteristics of the mask writer and/or requirements of the IC fab 1550. In FIG. 15, the mask data preparation 1532 and the mask fabrication 1544 are illustrated as separate elements. In some embodiments, the mask data preparation 1532 and the mask fabrication 1544 can be collectively referred to as a mask data preparation.

In some embodiments, the mask data preparation 1532 includes an optical proximity correction (OPC) which uses lithography enhancement techniques to compensate for image errors, such as those that can arise from diffraction, interference, other process effects and the like. The OPC adjusts the IC design layout diagram 1522. In some embodiments, the mask data preparation 1532 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, the mask data preparation 1532 includes a mask rule checker (MRC) that checks the IC design layout diagram 1522 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1522 to compensate for limitations during the mask fabrication 1544, which may undo part of the modifications performed by OPC in order to meet mask creation rules.

In some embodiments, the mask data preparation 1532 includes lithography process checking (LPC) that simulates processing that will be implemented by the IC fab 1550 to fabricate the IC device 1560. LPC simulates this processing based on the IC design layout diagram 1522 to create a simulated manufactured device, such as the IC device 1560. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine the IC design layout diagram 1522.

It should be understood that the above description of mask data preparation 1532 has been simplified for the purposes of clarity. In some embodiments, data preparation 1532 includes additional features such as a logic operation (LOP) to modify the IC design layout diagram 1522 according to manufacturing rules. Additionally, the processes applied to the IC design layout diagram 1522 during data preparation 1532 may be executed in a variety of different orders.

After the mask data preparation 1532 and during the mask fabrication 1544, a mask 1545 or a group of masks 1545 are fabricated based on the modified IC design layout diagram 1522. In some embodiments, the mask fabrication 1544 includes performing one or more lithographic exposures based on the IC design layout diagram 1522. In some embodiments, an electron-beam (e-beam) or a mechanism of multiple e-beams is used to form a pattern on a mask (photomask or reticle) 1545 based on the modified IC design layout diagram 1522. The mask 1545 can be formed in various technologies. In some embodiments, the mask 1545 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of the mask 1545 includes a transparent substrate (e.g., fused quartz) and an opaque material (e.g., chromium) coated in the opaque regions of the binary mask. In another example, the mask 1545 is formed using a phase shift technology. In a phase shift mask (PSM) version of the mask 1545, various features in the pattern formed on the phase shift mask are configured to have proper phase difference to enhance the resolution and imaging quality. In various examples, the phase shift mask can be attenuated PSM or alternating PSM. The mask(s) generated by the mask fabrication 1544 is used in a variety of processes. For example, such a mask(s) is used in an ion implantation process to form various doped regions in the semiconductor wafer 1553, in an etching process to form various etching regions in the semiconductor wafer 1553, and/or in other suitable processes.

The IC fab 1550 includes wafer fabrication 1552. The IC fab 1550 is an IC fabrication business that includes one or more manufacturing facilities for the fabrication of a variety of different IC products. In some embodiments, the IC Fab 1550 is a semiconductor foundry. For example, there may be a manufacturing facility for the front end fabrication of a plurality of IC products (FEOL fabrication), while a second manufacturing facility may provide the back end fabrication for the interconnection and packaging of the IC products (BEOL fabrication), and a third manufacturing facility may provide other services for the foundry business.

The IC fab 1550 uses mask(s) 1545 fabricated by the mask house 1530 to fabricate the IC device 1560. Thus, the IC fab 1550 at least indirectly uses the IC design layout diagram 1522 to fabricate the IC device 1560. In some embodiments, the semiconductor wafer 1553 is fabricated by the IC fab 1550 using mask(s) 1545 to form the IC device 1560. In some embodiments, the IC fabrication includes performing one or more lithographic exposures based at least indirectly on the IC design layout diagram 1522. The Semiconductor wafer 1553 includes a silicon substrate or other proper substrate having material layers formed thereon. The semiconductor wafer 1553 further includes one or more of various doped regions, dielectric features, multilevel interconnects, and the like (formed at subsequent manufacturing steps).

In accordance with some disclosed embodiments, a method is provided. The method includes: identifying a first design rule check (DRC) violation in a cluster box on an integrated circuit layout; locating a first target cell at a first original location in the cluster box, the first target cell being connected to the first DRC violation; detecting a first plurality of candidate locations for the first target cell in the cluster box; calculating resource costs associated with the first plurality of candidate locations; determining a first relocation location, among the first plurality of candidate locations, associated with a minimum resource cost for the first target cell; and relocating the first target cell from the first original location to the first relocation location.

In accordance with some disclosed embodiments, a method is provided. The method includes: identifying a blockage area on an integrated circuit (IC) layout, a routing congestion box being located in the blockage area, a plurality of cluster design rule check (DRC) violations being located in the routing congestion box; generating a detour path connecting a first endpoint and a second endpoint, the detour path surrounding the blockage area; identifying a plurality of candidate points on the detour path; selecting, among the plurality of candidate points, an anchor buffer such that a first fly line connecting the anchor buffer and the first endpoint and a second fly line connecting the anchor buffer and the second endpoint do not cross the routing congestion box; and storing the location of the anchor buffer.

In accordance with further disclosed embodiments, a congestion optimization platform is provided. The congestion optimization platform includes: a classification engine configured to receive design rule check (DRC) violation information on an integrated circuit (IC) layout and detect cluster DRC violations including a first DRC violation in a cluster box; a congestion optimization engine connected to the classification engine and configured to generate an optimization plan based on the DRC violation information; and an engineering change order (ECO) tool connected to the congestion optimization engine and configured to fix the first DRC violation in accordance with the optimization plan.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   identifying a first design rule check (DRC) violation in a cluster box on a post-routing integrated circuit layout;
   locating a first target cell at a first original location in the cluster box, the first target cell being connected to the first DRC violation;
   detecting a first plurality of candidate locations for the first target cell in the cluster box;
   calculating resource costs associated with the first plurality of candidate locations;
   determining a first relocation location, among the first plurality of candidate locations, associated with a minimum resource cost for the first target cell;
   relocating the first target cell from the first original location to the first relocation location;
   identifying a blockage area on the IC layout, a routing congestion box being located in the blockage area, a plurality of cluster DRC violations being located in the routing congestion box; and
   generating a detour path connecting a first endpoint and a second endpoint, the detour path surrounding the blockage area.

2. The method of claim 1, further comprising:
   identifying a second DRC violation in the cluster box;
   locating a second target cell at a second original location in the cluster box, the second target cell being connected to the second DRC violation;
   detecting a second plurality of candidate locations for the second target cell in the cluster box;
   calculating resource costs associated with the second plurality of candidate locations;

determining a second relocation location, among the second plurality of candidate locations, associated with a minimum resource cost for the second target cell; and relocating the second target cell from the second original location to the second relocation location.

3. The method of claim 2, further comprising:
storing the first relocation location.

4. The method of claim 3, wherein storing the first relocation location is prior to calculating the resource costs associated with the second plurality of candidate locations.

5. The method of claim 4, further comprising:
storing the second relocation location.

6. The method of claim 5, wherein the first relocation location and the second relocation location are used by an engineering change order (ECO) tool.

7. The method of claim 6, further comprising:
fixing the first DRC violation and the second DRC violation using the ECO tool.

8. The method of claim 1, wherein the first target cell is connected to the first DRC violation through a connection net.

9. The method of claim 8, wherein the connection net includes one or more metal tracks in one or more metal layers.

10. The method of claim 9, wherein the connection net further includes one or more vertical interconnect accesses (vias).

11. The method of claim 1, wherein the resource costs are based on at least one of:
a violation density in the cluster box;
a connection net distribution in the cluster box; and
a non-default rule (NDR) aware metal layer density.

12. The method of claim 1, further comprising:
extracting information on features of the IC layout.

13. The method of claim 1, further comprising:
identifying a plurality of candidate points on the detour path;
selecting, among the plurality of candidate points, an anchor buffer such that a first fly line connecting the anchor buffer and the first endpoint and a second fly line connecting the anchor buffer and the second endpoint do not cross the routing congestion box; and
storing a location of the anchor buffer.

14. A method, comprising:
determining an integrated circuit (IC) layout, including conducting a synthesis of an electronic device, generating a plurality of cells based on the synthesis, and determining a routing for the generated cells;
identifying a first design rule check (DRC) violation in a cluster box on the integrated circuit layout;
locating a first target cell at a first original location in the cluster box, the first target cell being connected to the first DRC violation;
detecting a first plurality of candidate locations for the first target cell in the cluster box;
determining a first relocation location from the first plurality of candidate locations;

relocating the first target cell from the first original location to the first relocation location;
identifying a blockage area on the IC layout, a routing congestion box being located in the blockage area, a plurality of cluster DRC violations being located in the routing congestion box;
generating a detour path connecting a first endpoint and a second endpoint, the detour path surrounding the blockage area.

15. The method of claim 14, further comprising:
calculating resource costs associated with the first plurality of candidate locations; and
wherein determining the first relocation location is based on the calculated resource costs.

16. The method of claim 15, wherein the resource costs include routing resources.

17. The method of claim 14, further comprising:
identifying a second DRC violation in the cluster box;
locating a second target cell at a second original location in the cluster box, the second target cell being connected to the second DRC violation;
detecting a second plurality of candidate locations for the second target cell in the cluster box;
determining a second relocation location from the second plurality of candidate locations; and
relocating the second target cell from the second original location to the second relocation location.

18. A system, comprising:
a classification engine configured to classify a plurality of design rule check (DRC) violations for a post-routing integrated circuit layout including cluster DRC violations, and generate a cluster box for the cluster DRC violations;
a cell relocation engine configured to:
locate a first target cell at a first original location in the cluster box, the first target cell being connected to the first DRC violation by a connection net;
detect a first plurality of candidate locations for the first target cell in the cluster box;
determine a first relocation location from the first plurality of candidate locations based on a routing resource for the first relocation location;
relocate the first target cell from the first original location to the first relocation location;
identifying a blockage area on the IC layout, a routing congestion box being located in the blockage area, a plurality of cluster DRC violations being located in the routing congestion box; and
generating a detour path connecting a first endpoint and a second endpoint, the detour path surrounding the blockage area.

19. The system of claim 18, wherein the connection net includes one or more metal tracks in one or more metal layers.

20. The system of claim 19, wherein the connection net further includes one or more vertical interconnect accesses (vias).

* * * * *